United States Patent
Talkowski et al.

(10) Patent No.: US 8,242,209 B2
(45) Date of Patent: Aug. 14, 2012

(54) TOUGHENED POLY(TRIMETHYLENE TEREPHTHALATE) COMPOSITION WITH REDUCED MELT VISCOSITY

(75) Inventors: Charles John Talkowski, Hockessin, DE (US); Karlheinz Hausmann, Auvernier (CH); David J. Walsh, Chadds Ford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 177 days.

(21) Appl. No.: 12/358,944

(22) Filed: Jan. 23, 2009

(65) Prior Publication Data

US 2009/0192266 A1   Jul. 30, 2009

Related U.S. Application Data

(60) Provisional application No. 61/023,220, filed on Jan. 24, 2008.

(51) Int. Cl.
*C08F 8/00* (2006.01)
(52) U.S. Cl. ........ 525/176; 525/165; 525/366; 525/437; 525/445
(58) Field of Classification Search .................. 525/176, 525/437, 445, 165, 366
See application file for complete search history.

(56) References Cited

U.S. PATENT DOCUMENTS

| | | | |
|---|---|---|---|
| 3,904,578 A * | 9/1975 | Kawase et al. | 524/334 |
| 4,187,358 A | 2/1980 | Kyo | |
| 4,273,899 A * | 6/1981 | Saiki et al. | 525/439 |
| 4,551,485 A * | 11/1985 | Ragan et al. | 523/212 |
| 4,753,980 A | 6/1988 | Deyrup | |
| 4,891,406 A * | 1/1990 | Bittscheidt et al. | 525/64 |
| 4,912,167 A | 3/1990 | Deyrup | |
| 5,091,478 A | 2/1992 | Saltman | |
| 5,344,912 A * | 9/1994 | Dalgewicz et al. | 528/308.1 |
| 5,498,650 A | 3/1996 | Flexman | |
| 6,020,414 A * | 2/2000 | Nelsen et al. | 524/424 |
| 6,245,844 B1 | 6/2001 | Kurian | |
| 6,943,214 B2 | 9/2005 | Flexman | |
| 7,354,973 B2 | 4/2008 | Flexman | |
| 7,381,772 B2 | 6/2008 | Flexman | |
| 2004/0242803 A1 | 12/2004 | Ohme | |
| 2005/0151296 A1 | 7/2005 | Obuchi | |
| 2006/0009556 A1 | 1/2006 | Lu | |
| 2006/0211810 A1* | 9/2006 | Persigehl et al. | 524/502 |
| 2007/0049690 A1* | 3/2007 | Borade et al. | 525/92 D |
| 2007/0117897 A1* | 5/2007 | Onda et al. | 524/394 |

FOREIGN PATENT DOCUMENTS

| | | | |
|---|---|---|---|
| JP | 2004-300376 A | | 10/2004 |
| JP | 2005-314611 | * | 10/2005 |
| JP | 2006-290952 A1 | | 10/2006 |
| JP | 2007 119594 A | | 5/2007 |
| JP | 2614200 B2 | | 1/2009 |
| WO | 8503718 A1 | | 8/1985 |
| WO | 2004101642 A1 | | 11/2005 |
| WO | 2007089644 A2 | | 8/2007 |

OTHER PUBLICATIONS

Kurian, J.V.; Journal of Polymers and the Environment, 2005, 13(2), p. 159-167.*
Humphreys, S.; Rapra Review Reports, 2006, p. 4-6.*
Yamaguchi, Enhanced Strain Hardening in Elongational Viscosity for HDPE/Crosslinked HDPE Blend. II. Processability of Theremoforming. J. Appl. Polym Sci. vol. 86, 79-83 (2002).
Baird, The role of extensional rheology in polymer processing, Korea-Australia J., vol. 11, No. 4, 305-311, Dec. 1999.

* cited by examiner

*Primary Examiner* — David W Wu
*Assistant Examiner* — Robert Jones, Jr.

(57) ABSTRACT

A composition is disclosed which comprises a mixture of a poly(trimethylene terephthalate) polymer composition, a nucleating agent, and an ethylene copolymer. Also disclosed in a method for reducing the melt viscosity of nucleated poly(trimethylene terephthalate) polymer composition.

19 Claims, No Drawings

TOUGHENED POLY(TRIMETHYLENE TEREPHTHALATE) COMPOSITION WITH REDUCED MELT VISCOSITY

This application claims priority to U.S. provisional application Ser. No. 61/023,220, filed Jan. 24, 2008; the entire disclosure of which is incorporated herein by reference.

The invention relates to a composition comprising poly (trimethylene terephthalate) and nucleators having improved stiffness and impact resistance and shaped articles produced therefrom and to a method for reducing melt viscosity of nucleated poly(trimethylene terephthalate) composition.

BACKGROUND OF THE INVENTION

Thermoplastic polymers are commonly used to manufacture various shaped articles that may be utilized in applications such as automotive parts, food containers, signs, and packaging materials. Shaped articles may be prepared from polyester by a number of melt extrusion processes known in the art, such as injection molding, compression molding, blow molding, and profile extrusion.

The most common polyester currently used is polyethylene terephthalate (PET). Due to recent trends toward sustainability and reduced use of petroleum, alternatives to PET are being investigated. Poly(trimethylene terephthalate), herein abbreviated 3GT, also referred to as PTT or polypropylene terephthalate, may be useful in many materials and products in which polyesters such as PET are currently used, for example molded articles. 3GT has properties including a semi-crystalline molecular structure.

British Patent 578097 disclosed the synthesis of 3GT in 1941. 3GT may be prepared using 1,3-propanediol derived from petroleum sources or from biological processes using renewable resources ("bio-based" synthesis). The ability to prepare 3GT from renewable resources makes it an attractive alternative to PET. 3GT produced from renewable sources of 1,3-propanediol is commercially available from E. I. du Pont de Nemours and Company (DuPont) under the tradename SORONA. DuPont pioneered a way to produce the 1,3-propanediol from renewable resources including corn sugar.

3GT may be modified with nucleators. For example, U.S. Pat. No. 6,245,844 discloses 3GT nucleated with a monosodium salt of a dicarboxylic acid selected from monosodium terephthalates, monosodium naphthalene dicarboxylates, and monosodium isophthalates. Other nucleators include salts of fatty acids, such as the sodium salt of montanic acid.

Nucleated 3GT polyesters containing mono-sodium terephthalate exhibit short crystallization half times and early onsets of crystallization as measured by differential scanning calorimetry (DSC) in cooling cycle tests. These are desirable effects because the nucleated polymers may quickly become rigid, leading to faster demold times and shorter cycle times in processing the polymers into shaped articles by such methods as thermoforming, injection molding, and blow molding. In addition, 3GT polyester containing mono-sodium terephthalate exhibited significant improvement in brittleness, heat resistance, and impact resistance over the non-nucleated 3GT.

Previously, toughening polyester has been achieved using an ionomer modifier, an epoxide-containing copolymer such as ethylene/n-butyl acrylate/glycidyl methacrylate (EBAGMA) (see WO85/03718) or a combination of ionomer and an epoxide-containing copolymer (see U.S. Pat. No. 5,091,478). The modifiers provided increased toughness and lower flex modulus, but the viscosity of the blends was increased, possibly due to reaction with the EBAGMA.

Despite the improvement in impact resistance found with nucleated 3GT, it is desirable to obtain 3GT compositions with even greater improvement in properties such as reduced stiffness (as demonstrated by lower Young's modulus) and impact resistance or toughness. Another desirable feature would be to reduce, or at least not increase, viscosity of the resultant blend in comparison with the nucleated 3GT.

SUMMARY OF THE INVENTION

The invention relates to a composition comprising, consisting essentially of, or prepared from a mixture of
(a) a poly(trimethylene terephthalate) polymer composition;
(b) about 0.005 to about 1 weight %, based on the combination of (a), (b) and (c), of a nucleating agent which is a sodium salt of a carboxylic acid; and
(c) about 3 to about 15 weight %, based on the combination of (a), (b) and (c), of a copolymer prepared by polymerization of ethylene and at least one ester comonomer having the formula $CH_2=C(R^1)CO_2R^2$, where $R^1$ is hydrogen or an alkyl group having 1 to 6 carbon atoms and $R^2$ is an alkyl group having 1 to 8 carbon atoms.

The invention also relates to shaped articles comprising or consisting essentially of the compositions described above.

The invention also relates to a method for reducing the melt viscosity of a first nucleated poly(trimethylene terephthalate) polymer composition comprising combining a poly(trimethylene terephthalate) polymer with a nucleating agent to produce a first blend; contacting the first blend with an ethylene copolymer to produce a second blend under such a condition that the melt viscosity of the second blend is reduced by at least 10% less than that of the first blend and the number average molecular weight of the second blend is at least 75% or 90% of that of the first blend wherein the nucleating agent is present in the second blend in the range of about 0.005 to about 1 weight %; the ethylene copolymer is present in the second blend in the range of about 1 to about 15, 1 to 10, 1 to 5, or 3 to 5, weight %; and the ethylene copolymer is as disclosed above.

DETAILED DESCRIPTION OF THE INVENTION

Entire disclosures of all references are incorporated by reference.

Trademarks or tradenames are in upper case.

"Copolymer" refers to polymers comprising copolymerized units resulting from copolymerization of two or more comonomers. "Dipolymer" refers to polymers consisting essentially of two comonomer-derived units and "terpolymer" means a copolymer consisting essentially of three comonomer-derived units.

"(Meth)acrylic acid" indicates methacrylic acid and/or acrylic acid and "(meth)acrylate" indicates methacrylate and/or acrylate.

The modified 3GT compositions described herein can exhibit lower flex modulus and enhanced impact resistance than previous 3GT compositions. The impact resistance, as determined by a Notched Izod Test (ASTM D-256), of nucleated 3GT polyester compositions may be doubled by adding a copolymer of ethylene and alkyl acrylate and/or alkyl methacrylate at 3 to 15 weight % of the 3GT polyester composition.

Unlike the results found with previous toughening modifiers, the viscosities of the blends with ethylene/alkyl(meth) acrylate copolymers are equal to or lower than the nucleated 3GT without the modifier. Melt viscosity of 3GT polyesters may be lowered by the addition of ethylene/alkyl(meth)acrylate copolymers (at levels from 3 to 15 weight % of the composition), resulting in higher melt flow. The modified blends with 3GT may have 60 to 90% of the melt viscosity of the nucleated 3GT without the modifier.

Additionally, the use of the low melting (lower than 100° C., e.g., 90° C.) ethylene/alkyl(meth)acrylate copolymer during the extrusion compounding appears to help keep melt temperature of the 3GT polyester (about 230° C.) composition at acceptable levels. Higher processing temperatures (higher than about 265° C., e.g., about 270-280° C.) may result in thermal degradation of the 3GT polymer. Without being bound by any particular theory, the low melting temperature of the ethylene/alkyl (meth)acrylate copolymer may help lubricate the screw and aid in heat transfer to the polyester, thereby reducing the level of needed mechanical work (heat) input.

The extrusion-compounded blends may have fine particles of the ethylene/alkyl(meth)acrylate copolymer well dispersed within the 3GT matrix. Particle diameters are 1 micron or less, as determined by transmission electron microscopy.

The ethylene/alkyl(meth)acrylate copolymer does not interfere with nucleation and/or crystallization of the 3GT composition while providing reduced melt viscosity and improved toughening.

These compositions may be useful for injection molding applications. Benefits may include better mold filling because of the higher flow, a broader processing window (lower melt temperatures, higher shear regions, and small gate sizes) and articles that have less molded-in stress.

A "3GT homopolymer" means any polymer consisting essentially of repeat units of trimethylene terephthalate. A 3GT homopolymer is substantially derived from the polymerization of 1,3-propanediol with terephthalic acid, or alternatively, derived from the ester-forming equivalents thereof (e.g., any reactants which may be polymerized to ultimately provide a polymer of poly(trimethylene terephthalate). The most preferred resin is poly(trimethylene terephthalate) homopolymer.

A "3GT copolymer" means any polymer comprising (or derived from) at least about 80 mole percent trimethylene terephthalate and the remainder of the polymer being derived from monomers other than terephthalic acid and 1,3-propanediol, or their ester forming equivalents. Ester-forming equivalents include diesters such as dimethylterephthalate. Examples of 3GT copolymers include copolyesters synthesized from 3 or more reactants, each having two ester forming groups. For example, a 3GT copolymer (co3GT) may be prepared by reacting 1,3-propanediol, terephthalic acid, and one or more comonomers selected from linear, cyclic, and branched aliphatic dicarboxylic acids having 4 to 12 carbon atoms such as butanedioic acid, pentanedioic acid, hexanedioic acid, azelaic acid, sebacic acid, dodecanedioic acid, 1,4-cyclohexane-dicarboxylic acid, or ester-forming equivalents thereof; aromatic dicarboxylic acids other than terephthalic acid having 8 to 12 carbon atoms such as phthalic acid, isophthalic acid or 2,6-naphthalenedicarboxylic acid; linear, cyclic, and branched aliphatic diols other than 1,3-propanediol having 2 to 8 carbon atoms such as ethanediol, 1,2-propanediol, 1,4-butanediol, hexamethylene glycol, 3-methyl-1,5-pentanediol, 2,2-dimethyl-1,3-propanediol, 2-methyl-1,3-propanediol, cyclohexane dimethanol or 1,4-cyclohexanediol; and aliphatic and aromatic ether glycols having 4 to 10 carbon atoms such as hydroquinone bis(2-hydroxyethyl)ether. Alternatively, a co3GT may be prepared from a poly(ethylene ether) glycol having a molecular weight below about 460, such as diethylene ether glycol, methoxypolyalkylene glycol, diethylene glycol, and polyethylene glycol. The comonomer may be present in the copolymer at a level of about 0.5 to about 15 mol %, and may be present at a level of up to about 30 mol %.

The 3GT copolymer may comprise other comonomers and such comonomers may be copolymerized into the copolymer chain in minor amounts, e.g., up to about 10 mol %, or up to about 5 mol %. Examples of such other comonomers include functional comonomers such as 5-sodium sulfoisophthalate, which can be in an amount of about 0.2 to about 5 mol %. Very small amounts, about 5 mol % or less, or about 2 mol % or less, of trimellitic anhydride, trimellitic acid, pyromellitic dianhydride (pmda), pentaerythritol or other acids or diols that have more than two reactive sites may be incorporated as branching agents to increase the melt viscosity and improve the rheology for coextrusion in multilayer structures. 3GT copolymers may contain at least about 85 mol %, at least about 90 mol %, at least about 95 mol %, or at least about 98 mol %, of copolymerized units of trimethylene terephthalate.

Because 3GT polyesters are well known to one skilled in the art, the description of their preparation is omitted for the interest of brevity.

In addition, the 3GT polymer may be a component of a polymer blend. The polymer blend may comprise, for example, at least about 80 weight %, or at least about 90 weight % of 3GT homopolymers or copolymers, based on the total weight of the blend composition.

When the 3GT polymer is a component of a polymer blend, the blend may be prepared by mixing a 3GT homopolymer or copolymer with one or more other polymers. Preferably, the 3GT polymer blend contains up to about 25 weight % of one or more of the other polymers, based on the total weight of the blend. Examples of other polymers suitable for blending with a 3GT homopolymer or copolymer are polyesters prepared from other diols, such as the diols described above.

A suitable 3GT polymer preferably has an intrinsic viscosity ranging from about 0.8 dl/g to about 1.4 dl/g, or about 0.9 dl/g to about 1.1 dl/g (as measured using Goodyear R-103B Equivalent IV Method at a concentration of 0.4 g/dL in 50/50 weight % trifluoroacetic acid/dichloromethane) and a number average molecular weight ($M_n$) ranging from about 15,000 to about 45,000, or about 25,000 to about 30,000.

The 3GT polyester may be blended with additives such as nucleators, tougheners and other modifiers. Additives includes pigment ($TiO_2$ and other compatible colored pigments), dye, plasticizer, filler (e.g., barium sulfate, and/or silicon oxide), nucleator, UV stabilizer, antioxidants, processing aids such as waxes, or combinations of two or more thereof. 3GT may be nucleated to improve crystallinity and heat resistance with a monosodium salt of a dicarboxylic acid selected from monosodium terephthalates, monosodium naphthalene dicarboxylates, and monosodium isophthalates. Suitable nucleation agents also include sodium salts of $C_{10}$ to $C_{36}$ (preferably $C_{18}$ to $C_{36}$, or $C_{30}$ to $C_{36}$) monofunctional organic acids, such as sodium stearate, sodium behenate, sodium erucate, sodium palmitate, sodium montanate, or combinations of two or more thereof. The term "monofunctional" refers to acids with one carboxylic acid moiety. Nucleated polyesters such as nucleated 3GT may have crystallization temperatures up to 50° C. higher than that of the non-nucleated polyester. An example of a nucleator is the sodium salt of montanic acid, commercially available under the tradename LICOMONT NaV101 from Clariant.

About 0.005 to about 1 weight % of a nucleating agent, preferably a monosodium salt of a dicarboxylic acid selected from monosodium terephthalates, monosodium naphthalene dicarboxylates, monosodium isophthalates, or a sodium salt of a $C_{10}$ to $C_{36}$ (preferably $C_{30}$ to $C_{36}$) monofunctional organic acid, is included in the compositions described herein. Use of small amounts of sodium salts of organic acids, such as those above, does not significantly affect melt viscosity of the 3GT polyester. Higher molar levels of sodium salts of organic acids lead to reduced molecular weight which reduces melt viscosity, but leads to inferior mechanical properties. Shorter-chain acid salts require lower amounts by weight to minimize molecular weight reduction. Of note is a composition as described herein comprising about 0.1 to about 1 weight % of a nucleator, for example a sodium salt of a $C_{30}$ to $C_{36}$ monofunctional organic acid.

Additives such as an antioxidant (e.g., hindered phenols characterized as phenolic compounds that contain sterically bulky radicals in close proximity to the phenolic hydroxyl group) may be used. Hindered phenols may include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-proplonate; n-octadecyl-3(3,5-di-tert-butyl-4-hydroxyphenyl)-propionate; 4,4'-methylenebis(2,6-tert-butyl-phenol); 4,4'-thiobis(8-tert-butyl-o-cresol); 2,6-di-n-tert-butylphenol; 6-(4-hydroxyphenoxy)-2,4-bis(n-octylthio)-1,3,5 triazine; di-n-octylthio)ethyl 3,5-di-tert-butyl-4-hydroxy-benzoate; sorbitol hexa[3-(3,5-di-tert-butyl-4-hydroxy-phenyl)-propionate], or combinations of two or more thereof. An antioxidant of note is bis-(2,4-di-t-butylphenyl) pentaerythritol diphosphite, CAS Number 26741-53-7, available under the tradename ULTRANOX 626 available from Chemtura. Of note is a composition as described herein comprising about 0.1 to about 1 weight % of an antioxidant.

The 3GT polymer resin may further contain suitable additives to improve strength, facilitate post melting processing, or provide other benefits. For example, hexamethylene diamine and/or polyamides (e.g., as nylon 6 or nylon 6-6) may be added in amounts of about 0.5 to about 5 mol % to improve processability. The polymeric additives may also be useful in blends of 3GT polymers and/or copolymers with other polymeric materials.

The ethylene ester copolymers useful as modifiers in the 3GT composition are copolymers prepared by polymerization of ethylene and one or more ester comonomer(s), including esters of unsaturated acids having the formula $CH_2=C(R^1)CO_2R^2$, where $R^1$ is hydrogen or an alkyl group having 1 to 6 carbon atoms and $R^2$ is an alkyl group having 1 to 8 carbon atoms. For example, the ester comonomer may be methyl, ethyl, or butyl methacrylate. Other useful ester comonomers include one or more of methyl acrylate, ethyl acrylate, n-butyl acrylate, tert-butyl acrylate, iso-butyl acrylate, and sec-butyl acrylate.

The ethylene ester copolymer may comprise up to about 80 weight %, about 3 to about 70 weight %, about 3 to about 40 weight %, about 20 to about 40, about 30 to about 40 weight %, or about 30 to about 35, weight %, of copolymerized units of the ester comonomer of formula $CH_2=C(R^1)CO_2R^2$ based on the total weight of the ethylene ester copolymer.

Specific examples of the ethylene ester copolymers include dipolymers produced by the copolymerization of ethylene and an alkyl acrylate or alkyl methacrylate such as methyl acrylate, ethyl acrylate or butyl acrylate.

Additional comonomers may be present as copolymerized units in the ethylene copolymers. That is, the copolymers may be dipolymers, terpolymers or higher order copolymers. For example, the ethylene ester copolymers may additionally comprise other comonomers such as carbon monoxide. When present, copolymerized units of carbon monoxide generally may comprise up to about 20 weight %, or about 3 to about 15 weight % of the total weight of the ethylene ester copolymer. The ethylene ester copolymer does not contain epoxide-containing comonomers such as glycidyl methacrylate.

The ethylene ester copolymers may be prepared by any suitable process. In particular, the ethylene ester copolymers may be prepared by polymerization of the foregoing monomers in the presence of a free-radical polymerization initiator at elevated temperatures (e.g., about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372, 3,756,996, 5,532,066, 5,543,233, and 5,571,878). The ethylene ester copolymers may be homogeneous or not. For example, the ethylene ester copolymers may not be homogeneous in terms of concentration of monomer units along the polymer chain due to imperfect mixing during polymerization or variable monomer concentrations during the course of the polymerization.

The comonomer copolymerized with ethylene may be selected from the group consisting of methyl acrylate, ethyl acrylate, n-butyl acrylate, and combinations thereof. Preferably the ethylene ester copolymer is selected from the group consisting of ethylene/methyl acrylate copolymer, ethylene/ethyl acrylate copolymer, ethylene/n-butyl acrylate copolymer, and mixtures thereof, and more preferably ethylene/methyl acrylate copolymer.

The ethylene/alkyl acrylate copolymer may comprise from about 20 to about 30 weight % of methyl acrylate as the alkyl acrylate component. Ethylene/methyl acrylate copolymers, for example, may comprise 24 weight % of methyl acrylate, 25 weight % of methyl acrylate or 30 weight % of methyl acrylate. Ethylene/alkyl acrylate copolymers are commercially available from E. I. du Pont de Nemours and Company (DuPont) under the ELVALOY AC tradename. Other ethylene alkyl acrylate copolymers may also be suitable.

Ethylene acrylate copolymers with higher mole levels of methyl acrylate may provide better toughening than the lower mole levels (comparable weight level) of ethylene butyl acrylate copolymers.

The invention also provides a shaped article comprising, consisting essentially of, or produced from the polyester composition disclosed herein. The compositions described herein are particularly useful for molding small and/or thin-walled articles. The toughened compositions are useful for high-sheer, high-throughput injection molding applications. Molded articles may be produced from a composition disclosed above, by virtually any method of extrusion processing known to those skilled in this art. For example, a melt extrusion process such as injection molding, coinjection molding, compression molding, overmolding or profile extrusion may be used. As such, the articles may be injection molded, compression molded, profile extruded or the like. Injection molded articles are of note. In addition, the shaped articles may comprise material other than the modified polyester, such as layers of polymeric material other than the modified polyester including the presence of tie layers and the like, or nonpolymeric substrates. For example, articles may be prepared by coinjection molding wherein two melt streams are injected into a mold in such a way that one polymer (often, the more expensive and/or more functional polymer) is on the exterior of the article while the lower cost, lower performing polymer is in the interior.

Various additives may be present in the respective layers such as antioxidants and thermal stabilizers, ultraviolet (UV)

light stabilizers, pigments and dyes, fillers, delustrants, antislip agents, plasticizers, other processing aids, and the like may be employed in the other layers.

Any physical forms, such as pellets, of 3GT may be used. After being optionally blended or coated with any desired additives by, e.g., drying mixing to produce a mixture, the mixture can be further blended with a nucleating agent, preferably by melt blending such as with an extruder. The blending temperature, e.g., barrel temperature of an extruder barrel, may be raised from a cold feed to about 250° C. to about 265° C. and the mixture may be conveyed forward to a mixing zone near the front end of the extruder. The mixing zone may have kneading blocks for mixing to provide a well dispersed mixture. The extrudate may be quenched in a water bath and then cut into pellets. The pellets may be dried and tested for melt viscosity and molded into articles.

A film may be made from the composition by melt-processing using known processes such as co-extrusion, sheet extrusion, extrusion casting, extrusion coating, thermal lamination, blown film methods, or any known processes. Because the processes for making films are well known to one skilled in the art, the description is omitted herein for the interest of brevity. The film may be about 10 to about 1000, about 15 to about 800, about 15 to about 500, or about 20 to about 250 µm thick.

The composition may also be a layer of film or sheet and coextruded with an ethylene-containing polymer to produce a multilayer film or sheet. The other layers may comprise one or more polymers such as an ethylene-containing polymer. Coextrusion is well known to one skilled in the art and its description is omitted for the interest of brevity.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer may range from about 5 to about 200 µm.

The composition may be useful as a structure layer in a multilayer film or sheet. Additional structure layers may include polyamide(nylon) or polypropylene. The structure layer may be printed, for example, by reverse printing using rotogravure methods.

The inner layer may include one or more barrier layers to reduce the permeation rate through the layer by agents such as water, oxygen, carbon dioxide, electromagnetic radiation such as ultraviolet radiation, and methanol that potentially may affect the product inside therein. Barrier layers may comprise, for example, polypropylene, polyethylene terephthalate, ethylene vinyl alcohol, polyvinyl alcohol, or polyvinylidene chloride.

The innermost layer of the package may be the sealant and may be a polymer layer or coating that may be bonded to itself (sealed) or other film or substrate at temperatures substantially below the melting temperature of the outermost layer. Sealants are well known and may be commercially available from DuPont.

A multilayer film may be produced by any methods well known to one skilled in the art such as, for example, coextrusion and may be laminated onto one or more other layers or substrates. Other suitable converting techniques are, for example, blown film (co)extrusion and extrusion coating.

Films may be used to prepare packaging materials such as containers, pouches and lidding, labels, tamper-evident bands, or engineering articles.

Various injection-molded articles may be prepared from the modified 3GT resins described herein, including small household items and parts for machinery and vehicles. Household and personal items include combs and other hair setting and styling utensils, other personal care utensils, eyeglass frames, telephones, computer housings, keypads and mouse units, writing utensils, flatware, calculators, cameras, pails, garbage containers, game boards and pieces, toys, credit cards, and furniture, and tool handles. Machine and vehicle parts such as steering wheels, handles, knobs, and the like may be prepared. Containers and caps may also be prepared from the modified 3GT resin.

Molded articles include caps or closures comprising a composition disclosed above. Caps may be compression molded or injection molded. Such caps may be used to close and seal a wide variety of containers for a wide variety of products including: beverages, including carbonated soft drinks and pasteurized beverages such as beer; foods, especially those where container sealing performance is desirable, including oxygen sensitive ones such as mayonnaise, peanut butter and salad oil, and including corrosive ones such as vinegar, lemon juice; and household chemicals, including bleaches, detergents, personal hygiene products, medicaments, drugs, cosmetics, petroleum products, and other products requiring the highest integrity seal and reseal under the widest range of distribution and use conditions.

Cap sizes may typically range from under about 1 mm to about 50 mm or 20 mm to 120 mm. Bottle and/or jar sizes may range from under 2-ounce to about 12-ounce capacity or larger. Larger capacity containers such as bowls, trays, cups, cans, buckets, tub, boxes and the like are also suitable, as are smaller vials, bottles and other containers.

Small vials, bottles, jars and other containers comprising the modified 3GT polyester composition may be prepared, for example, by injection molding. Liquids that may be packaged in vials, bottles and jars include cosmetics, perfumes, milk and other dairy products, edible oils, syrups, sauces, purees such as baby foods, and pharmaceuticals. Bowls and trays may be suitable for packaging solids and/or liquids, including various food items.

Another example of a shaped article is a profile. Profiles are defined by having a particular shape and by their process of manufacture known as profile extrusion. Profiles are not film or sheeting, and thus the process for making profiles does not include the use of calendering or chill rolls. Profiles are also not prepared by injection molding processes. Profiles may be fabricated by melt extrusion processes that begin by extruding a thermoplastic melt through an orifice of a die forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With extremely complex shapes, support means are often used to assist in shape retention.

A common shape of a profile is tubing. Tubing assemblies for the transport of liquids and vapors are well known in the art. Tubing may be used for fluid transfer in medical applications or in transferring fluids such as beverages. These applications require good moisture barrier properties, chemical resistance, toughness and flexibility.

Overmolding of a substrate such as a metal insert, shaped polymeric part or combination thereof with the modified 3GT polyester also produces shaped articles comprising an outer layer of the modified 3GT polyester. Alternatively, the 3GT composition as described herein may be used as a substrate that may be overmolded with other polymeric materials.

In overmolding, the composition is molded over or around at least a portion of a substrate, such as a metal or plastic piece. The substrate is placed within the mold tooling of an injection-molding machine. The mold tooling when closed defines a cavity sized to receive the substrate in preparation for overmolding with the injection molding material. The interior walls of the mold tooling define the shape of the final overmolded piece. The mold tooling typically includes inwardly projecting pins, which serve to position and secure the substrate within the tooling during the injection process. The pins may be retracted by pressure response pin retractors into the mold tooling near the end of the injection cycle. A sprue through which the injection molding material is injected is also present in the mold tooling.

When the heated and plasticized molding material is injected under pressure by the injection-molding machine, the plasticized molding material flows in through the sprue and fills the cavity. When the mold cavity is completely filled, the internal pressure within the cavity increases. The pins that position the substrate within the cavity are connected to pressure sensitive pin retractors. When the pressure in the mold cavity reaches a predetermined level, the pins retract into the mold cavity wall, and the molding material fills the space vacated by the pins. Upon completion of the overmolding process, the mold tooling is opened and the completed shaped article is ejected.

The resulting article has a casing or surface layer of the composition over at least a portion of the substrate. The overmolded casings may have a wall thickness of between about 0.005 inches to over one inch, depending on the desired exterior shape of the completed assembly and the shape of the substrate. The wall thickness of the casing may be uniform or vary at various locations about the substrate; however, for most applications the wall thickness may be less than 0.5 inches.

The modified 3GT compositions disclosed here may also be stamped or molded into shapes such as in blister packaging or shallow compartments used for pharmaceutical compartments.

EXAMPLES

The Examples are illustrative and are not to be construed as to unduly limit the scope of the invention.
Materials Used
3GT-1: A 3GT homopolymer available commercially under the tradename Sorona from DuPont.
EMA-1: an ethylene/methyl acrylate dipolymer (30 weight % MA), MI of 3 g/10 min.
Nuc-1: sodium montanate obtained from Clariant under the tradename LICOMONT NaV101.
AO-1: bis-(2,4-di-t-butylphenyl) pentaerythritol diphosphite antioxidant from Chemtura under the tradename ULTRA-NOX 626.
I-1: an ethylene/methacrylic acid dipolymer (15 weight % MAA), neutralized with $Na^+$ (59%), MI of 0.9 g/10 min.
EBAGMA-1: a terpolymer of 70 weight % of ethylene/25 weight % of n-butyl acrylate/5 weight % of glycidyl methacrylate.
Results
Pellets of 3GT-1 homopolymer (C1) were coated with antioxidant AO-1 and nucleator Nuc-1 and dried to give pellets of Comparative Example C2. The 3GT-1 pellets were shaken with powders of AO-1 and Nuc-1 to provide the dry-coated pellets. Dried pellets of C2 were added to the back end of a W & P twin screw extruder along with pellets of the modifier. The barrel temperature of the extruder barrels was raised from a cold feed to about 250° C. and the pellets conveyed forward to a mixing zone near the front end of the extruder. The mixing zone had kneading blocks to mix the ingredients and the zone had a "reverse" element to create a seal between the extruder barrel and the extruder screw elements. The reverse element pumped the melt momentarily backwards. The seal allowed vacuum to be applied at the next barrel section so that volatiles were removed. The barrel temperatures were then dropped to about 240° C. and the die was also set to that temperature range. This provided a well dispersed mixture, with melt temperature of around 255 to 265° C. The strand extrudate was quenched in a water bath and the strand was cut into pellets. The compositions that were prepared are summarized in Table 1 wherein the amounts are reported in weight %.

Comparative Examples C3 and C4 were prepared in the same manner and are compositions modified by an ionomer and an epoxide-containing copolymer respectively.

TABLE 1

| Example | Weight % | | | | | |
| --- | --- | --- | --- | --- | --- | --- |
| | 3GT-1 | Nuc-1 | AO-1 | I-1 | EMA-1 | EBAGMA-1 |
| C1 | 100 | 0 | 0 | 0 | 0 | 0 |
| C2 | 99.4 | 0.5 | 0.1 | 0 | 0 | 0 |
| C3 | 79.4 | 0.5 | 0.1 | 20 | 0 | 0 |
| C4 | 89.4 | 0.5 | 0.1 | 0 | 0 | 10 |
| 1 | 94.4 | 0.5 | 0.1 | 0 | 5 | 0 |
| 2 | 89.5 | 0.4 | 0.1 | 0 | 10 | 0 |

The pellets of the 3GT compositions were dried and tested for melt viscosity and molded using an Arburg injection molding machine. D1708 tensile bars were made and used in stress/strain measurements.

Notched Izod tests were conducted according to ASTM procedure D256 or ISO 180. Young's Modulus is determined using the initial slope of the stress/strain curve. Gardner Impact measurements were conducted according to ASTM procedures D4226, D5420 or D5628.

TABLE 2

| Example | Notched Izod (ft-lb/inch) 23° C. | Young's Modulus (kpsi) | Gardner impact (inch-lb) |
| --- | --- | --- | --- |
| C2 | 0.42 | 400 | 32 |
| C4 | — | — | 152 |
| 1 | 0.65 | 350 | 56 |
| 2 | 1.03 | 300 | 104 |

Compared to Comparative Example C2, addition of 5 weight % of EMA-1 provided at least 50% increase in Notched Izod and 10 weight % provided more than 100% increase. Addition of 5 or 10 weight % of EMA-1 reduced Young's modulus compared to Comparative Example C2.

Melt rheology was measured on a piston rheometer (Dynisco Capillary Rheometer, Model LCR 7000) run at constant temperature (260° C.), with samples having from 100 to 150 ppm moisture. Sample pellets were introduced into the chamber, thermally equilibrated and melted for six minutes. Pressure was applied to the pellets to eliminate air pockets. After six minutes force was applied to the pellets to achieve a series of selected shear rates. The force required to achieve the shear rate was measured and the resultant melt viscosity determined. Table 3 reports the melt viscosity at 1000 $sec^{-1}$.

As summarized in Table 3, compositions comprising 3GT-1 and tougheners were prepared and their Mn, Mw and Mz were measured using column chromatography according to standard protocols used in molecular weight determinations. Mn is the number average molecular weight; Mw is the weight average molecular weight and Mz is the z "moment" average molecular weight.

DSC (differential scanning calorimetry) was used to measure the crystallization speed and amount of crystallization of an amorphous sample during heating above its glass transition temperature. A method for measuring ease of crystallization is to record the crystallization temperature, that is, the temperature at the peak of the crystallization exotherm during cooling. Crystallization exotherm measurements were conducted on a TA Instruments (New Castle, Del.) Model Q1000 and operated on about 5 to 10 mg of sample with 10° C./minute heating from ambient to 260° C., then cooling at 10° C./minute back to ambient. The amount of nucleation (crystallization) was assessed by observing the temperature at which the maximum exotherm (heat release during crystallization) occurred.

TABLE 3

| Example | Melt viscosity (1000 sec$^{-1}$; Pa · sec) | Mw | Mn | Mz | Crystallization* (° C.) |
|---|---|---|---|---|---|
| C1 |  | 49930 | 23140 | 75870 | 153 |
| C2 | 140-150 | 46430 | 23500 | 69900 | 200 |
| C3 | 175-215 |  |  |  | 203 |
| C4 | 210 |  |  |  |  |
| 1 | 125 |  |  |  |  |
| 2 | 89 | 46550 | 21980 | 71230 | 202 |

DSC temperature at maximum point on the exotherm curve on cooling from melt temperature of 260° C., with cooling rate of 10° C./minute.

The compositions modified with EMA provided reduced melt viscosity (at least 10% less than that of C2) without significantly reducing molecular weight of the 3GT polymer (Example 2 has at least 90% of the number average molecular weight of the C2). In contrast, modification with an ionomer (C3) or an epoxide-containing copolymer (C4) produced increased melt viscosity.

While certain of the preferred embodiments of the invention have been described and specifically exemplified above, it is not intended that the invention be limited to such embodiments. Various modifications may be made without departing from the scope and spirit of the invention, as set forth in the following claims.

The invention claimed is:

1. A composition comprising a mixture of a poly(trimethylene terephthalate) polymer composition, 0.005 to about 1 weight % of a nucleating agent, and about 1 to 15 weight % of an ethylene copolymer, based on the weight of the mixture, wherein
    the composition has at least 50% increase in a notched Izod test conducted according to ASTM procedure D256 or ISO 180 compared to a composition consisting essentially of the poly(trimethylene terephthalate) polymer composition and the nucleating agent;
    the melt viscosity of the composition is lower than the melt viscosity of a corresponding composition that does not comprise the ethylene copolymer;
    the nucleating agent is a sodium salt of a carboxylic acid; and
    the ethylene copolymer prepared by polymerization of ethylene and at least one ester comonomer having the formula $CH_2=C(R^1)CO_2R^2$, where $R^1$ is hydrogen or an alkyl group having 1 to 6 carbon atoms and $R^2$ is an alkyl group having 1 to 8 carbon atoms.

2. The composition of claim 1 wherein
    the poly(trimethylene terephthalate) polymer composition is trimethylene terephthalate homopolymer, trimethylene terephthalate copolymer comprising at least about 70 mol % of copolymerized monomer units of trimethylene terephthalate, blend comprising at least about 75 weight % of trimethylene terephthalate homopolymer, or blend comprising at least about 75 weight % of trimethylene terephthalate copolymer; and the nucleating agent is a monosodium salt of a carboxylic acid; and
    the melt viscosity of the composition is at least 10% lower than the melt viscosity of the corresponding composition.

3. The composition of claim 2 wherein the poly(trimethylene terephthalate) polymer composition has an intrinsic viscosity of about 0.5 to about 1.4 dl/g prior to mixing with the nucleating agent and the ethylene copolymer; and the ethylene copolymer is present in the composition from 3 to 5 weight %.

4. The composition of claim 1 wherein the poly(trimethylene terephthalate) polymer composition has an intrinsic viscosity of about 0.5 to about 1.4 dl/g prior to mixing with the nucleating agent and the ethylene copolymer.

5. The composition of claim 2 wherein
    the nucleating agent is monosodium terephthalate, monosodium naphthalene dicarboxylate, monosodium isophthalate, sodium stearate, sodium behenate, sodium erucate, sodium palmitate, sodium montanate, or combinations of two or more thereof; and
    the molecular weight of the composition is at least 75% of the molecular weight of the corresponding composition.

6. The composition of claim 4 wherein
    the nucleating agent is monosodium terephthalate, monosodium naphthalene dicarboxylate, monosodium isophthalate, sodium stearate, sodium behenate, sodium erucate, sodium palmitate, sodium montanate, or combinations of two or more thereof; and
    the molecular weight of the composition is at least 75% of the molecular weight of the corresponding composition.

7. The composition of claim 6 wherein $R^1$ is hydrogen or a methyl group and $R^2$ is an alkyl group having 1 to 4 carbon atoms.

8. The composition of claim 7 wherein $R^1$ is hydrogen and the ethylene copolymer comprises repeat units derived from about 20 to about 40 weight % of methyl acrylate.

9. The composition of claim 8 wherein
    the ethylene copolymer comprises repeat units derived from about 30 to about 40 weight % of methyl acrylate; and
    the molecular weight of the composition is at least 90% of the molecular weight of the corresponding composition.

10. A shaped article comprising the composition of claim 1.

11. The article of claim 10 wherein the poly(trimethylene terephthalate) polymer composition is trimethylene terephthalate homopolymer, trimethylene terephthalate copolymer comprising at least about 70 mol % of copolymerized monomer units of trimethylene terephthalate, blend comprising at least about 75 weight % of trimethylene terephthalate homopolymer, or blend comprising at least about 75 weight % of trimethylene terephthalate copolymer; and the nucleating agent is a monosodium salt of a carboxylic acid.

12. The shaped article of claim 11 wherein the article is a film or sheet.

13. The article of claim 12 wherein the nucleating agent is monosodium terephthalate, monosodium naphthalene dicarboxylate, monosodium isophthalate, sodium stearate, sodium behenate, sodium erucate, sodium palmitate, sodium montanate, or combinations of two or more thereof.

14. The article of claim 13 wherein the ethylene copolymer comprises repeat units derived from about 30 to about 40 weight % of methyl acrylate.

15. A method comprising combining a poly(trimethylene terephthalate) polymer with a nucleating agent to produce a first blend; contacting the first blend with an ethylene copolymer to produce a second blend under such a condition that the melt viscosity of the second blend is reduced by at least 10% less than that of the first blend, the second blend has at least 50% increase in a notched Izod test conducted according to ASTM procedure D256 or ISO 180 compared to the first blend, and the number average molecular weight of the second blend is at least 75% of that of the first blend wherein
the nucleating agent is present in the second blend in the range of about 0.005 to about 1 weight %;
the ethylene copolymer is present in the second blend in the range of about 3 to about 15 weight %; and
the ethylene copolymer comprises repeat units derived from ethylene and at least one ester comonomer having the formula $CH_2=C(R^1)CO_2R^2$, $R^1$ is hydrogen or a $C_{1-6}$ alkyl group, and $R^2$ is a $C_{1-8}$ alkyl group.

16. The method of claim 15 wherein the number average molecular weight of the second blend is at least 90% of that of the first blend; the second blend consists essentially of the poly(trimethylene terephthalate) polymer, the nucleating agent, and the ethylene copolymer; and the second blend has at least 50% impact strength, as determined by Notched Izod test, than the first blend.

17. The method of claim 16 wherein the combining and the contacting are each independently melt mixing.

18. The method of claim 17 wherein the melt mixing comprises extrusion compounding.

19. The method of claim 11 wherein the method is carried out under a condition such that the second blend comprises particles of the ethylene/alkyl (meth)acrylate copolymer having diameters of 1 μm or less and is present in the second blend as a dispersed phase in the poly(trimethylene terephthalate) polymer.

* * * * *